No. 851,375. PATENTED APR. 23, 1907.
G. G. RAYMOND.
SUPPORT FOR ELECTRIC CABLES.
APPLICATION FILED DEC. 22, 1904.
2 SHEETS—SHEET 1.
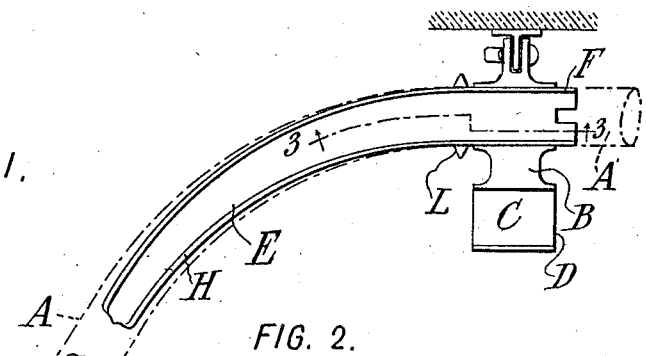
FIG. 1.
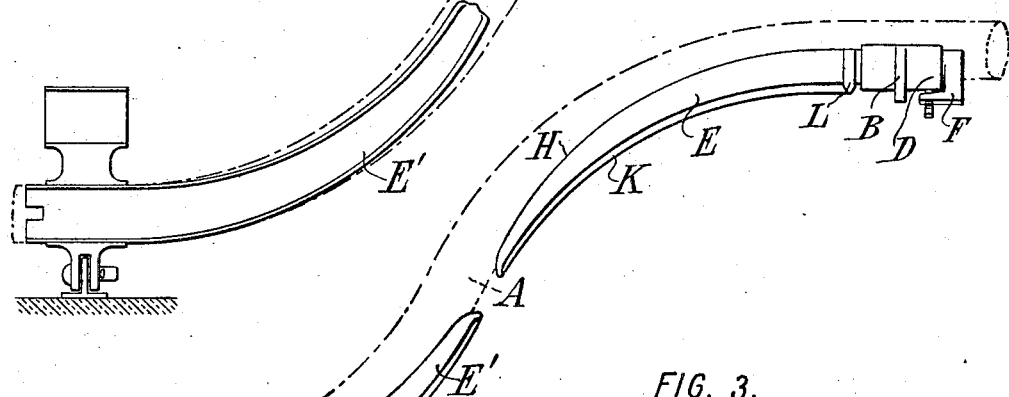
FIG. 2.
FIG. 3.
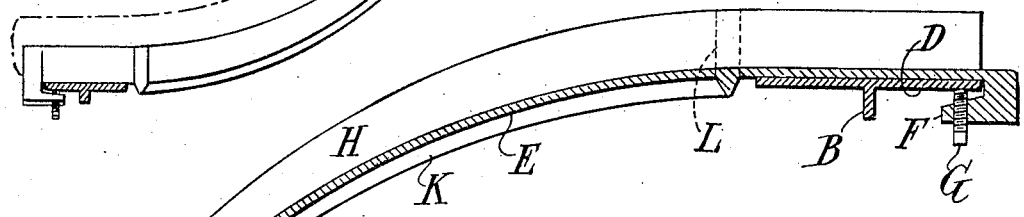
FIG. 4.
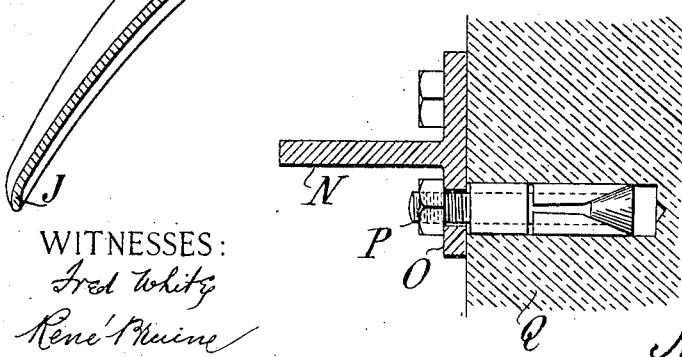
WITNESSES:
Fred White
René Ruine
INVENTOR:
George G. Raymond,
By Attorneys,
Arthur E. Frasert No. 851,375. PATENTED APR. 23, 1907.
G. G. RAYMOND.
SUPPORT FOR ELECTRIC CABLES.
APPLICATION FILED DEC. 22, 1904.
2 SHEETS—SHEET 2.
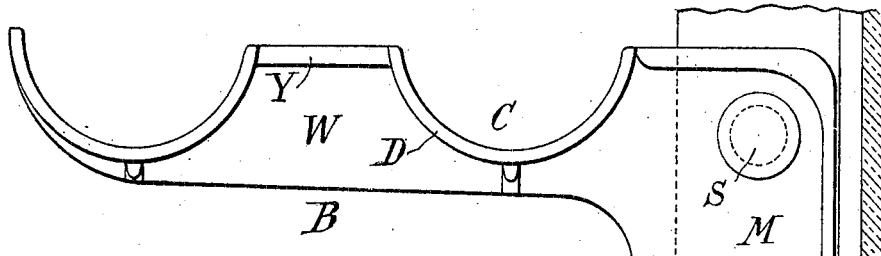
FIG. 5.
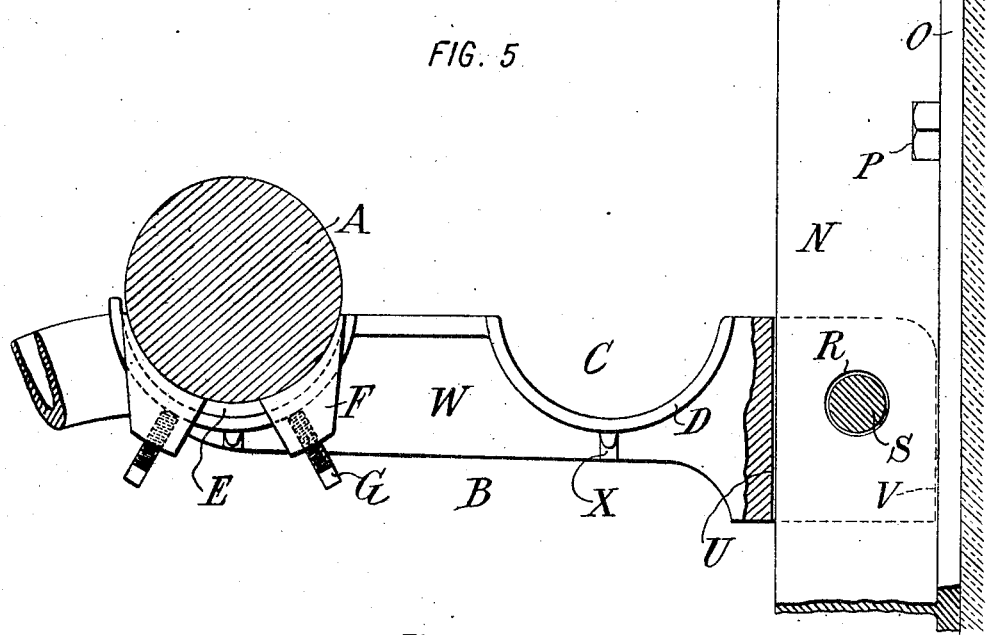
FIG. 6.
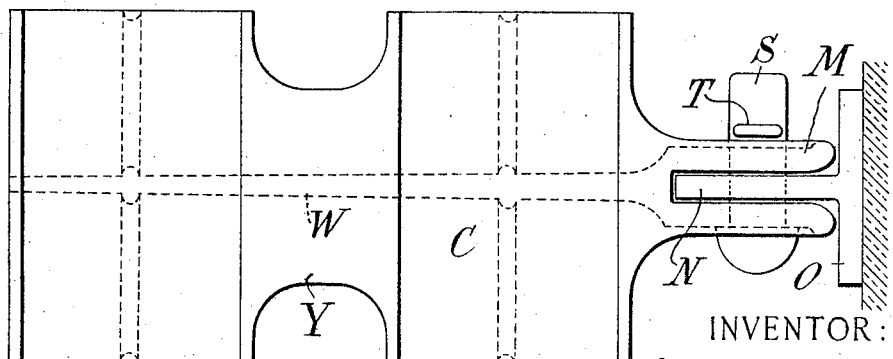
WITNESSES:
Fred White
René Pruine
INVENTOR:
George G. Raymond,
By Attorneys,
Arthur C. Fraser & Co.

UNITED STATES PATENT OFFICE.

GEORGE G. RAYMOND, OF NEW ROCHELLE, NEW YORK.

SUPPORT FOR ELECTRIC CABLES.

No. 851,375.  Specification of Letters Patent.  Patented April 23, 1907.

Application filed December 22, 1904. Serial No. 237,929.

*To all whom it may concern:*

Be it known that I, GEORGE G. RAYMOND, a citizen of the United States, residing at New Rochelle, in the county of Westchester and State of New York, have invented certain new and useful Improvements in Supports for Electric Cables, of which the following is a specification.

Where electric cables run through manholes, vaults, tunnels and the like, it is customary to support them upon arms extending out from the side of the structure, in a direction transverse to the length of the cables, or these transverse arms may extend from both sides of uprights placed within the structure. It is important to be able to support the cables close together, and to quickly insert them upon or remove them from a supporting arm; and also to be able to remove one of the transverse arms, or to adjust it in another position quickly and easily and without disturbing the other cables.

The present invention provides a construction which facilitates the various operations described, and which at the same time is extremely strong and simple.

Where a cable has to be bent out of a straight line, as for example in a manhole where it passes from a higher to a lower level and to a different direction, the comparatively lead covering of the cables is apt to be soft injured. It is customary to leave such a bent portion of the cable without support, the weight being held by the supported straight portion of the cable. I have found that by providing a support for the curved portion of the cable, the danger of injury at this point is lessened. The greatest danger is at the point where a cable curves downward from an upper level, the upper edge of the cable being convex at this point, and being liable to injury, and I have provided a special form of support for this portion of the curve in a cable.

Other improvements are provided which are specified in detail hereinafter.

The accompanying drawings illustrate embodiments of the invention.

Figure 1 illustrates in plan a method of supporting a cable which is curved both vertically and horizontally, thus showing the most complex situation which may arise; Fig. 2 is a side elevation of the same; Fig. 3 is a vertical section of the support for the upper end of the curved portion of the cable; Fig. 4 is a detail showing the method of fastening the main supports to the wall; Fig. 5 is a side elevation of a main or vertical support with two transverse supports attached thereto; Fig. 6 is a plan of the same.

The cable is indicated at A, and throughout the greater portion of its length rests in suitable sockets upon the transverse arms, a number of arms being arranged one above another, and a number of sockets being provided in each arm, as is well understood. Such transverse arms or supports are indicated at B, and are provided with sockets C to hold the cables from lateral motion, and with flanges D which reinforce the arms B, and which serve the also important function of providing means for ready attachment of the support for the curved portion of the cable. The arms B practically form parts of the permanent structure, since, although detachable, they are very rarely detached from their supports. For carrying the curved portion of the cable, an arm E is provided, whose upper supporting face is a convex curve longitudinally of the cable, and the transverse section of which is preferably trough-shaped. A concave arm E' may also be used for supporting the lower end of the curved portion of the cable as will be readily understood from Fig. 2. The arms E (and E' where one is used) are shaped on their under sides to fit the sockets C, and are provided at one end with lugs F which hook under the flanges D. Bolts G may be used to fasten the longitudinal support to the transverse support. The longitudinal support consists mainly of a long trough, the sides H of which taper toward the free end and the curvature of which corresponds substantially to that to be given to the cable so as to support the latter directly and rigidly at all points. The end J of the support is preferably bent downward sufficiently to be out of contact with the cable, so that the latter will leave its support gradually and there will be no cutting action if the cable sags a little at the point where it leaves its support. The support is preferably provided also with a longitudinal rib K on the center of its under side, and a transverse rib L surrounding it at a point just beyond its bearing upon the transverse arm B, thus stiffening and strengthening the arm E without interfering with its ready connection with the arm B. There are preferably two lugs or flanges F, and two fastening bolts G, as indicated in Fig. 5, which prevents any tendency of the member E to rock laterally under the strain of supporting the cable at its free end, which may be offset laterally from the attached end.

In the transverse arms for supporting the straight lengths of cable as now generally used, the arm is attached to its vertical support in such a way that the removal of the arm to adjust it or for any other purpose, necessitates swinging the arm up. As the arm carries a considerable weight of cables, and as the arms are close together one above another and any disturbance of the cables is to be avoided, this necessity of tilting the arm is a serious objection in practice. The arm B of my improved construction may be inserted or withdrawn in a horizontal direction without any tilting whatever. To permit this operation, it is provided at its inner end with a fork, the two prongs M of which straddle the web N of a T-shaped bar the flanges O of which may be fastened by means of expansion bolts P (Fig. 4) to the masonry wall Q of the tunnel or other structure, or which may be fixed by fastening its ends to the roof or floor, or in any other suitable manner. The web N of the upright is provided with holes R at suitable intervals corresponding with the vertical spacing of the arms B (and which spacing may be closer together than formerly), and bolts S pass freely through the holes R, and are held in place by means of cotter pins T. This is a connection which can be very quickly made or unmade, and the bracket is held firmly in place, the edge U of the bracket and also the innermost edge V being parallel and close to the adjoining faces of the vertical support so as to prevent tilting the arm up or down.

From the fork M the body of the support B extends as a deep comparatively thin vertical web W, provided with any desired number of sockets C at its upper edge, the sockets being reinforced by very wide flanges D, and also by flanges X on their under sides. Horizontal flanges Y are also provided at the upper edge of the arm between the successive sockets C. This construction provides an extremely strong and at the same time light and simple arm, which serves all the desired functions.

Though I have described with great particularity of detail a specific structure embodying the invention, yet it is not to be understood therefrom that the invention is limited to the specific embodiment described. Various modifications thereof in detail and in the arrangement and combination of the parts may be made by those skilled in the art, without departure from the invention.

What I claim is:—

1. Means for supporting the weight of a curved portion of a cable in a manhole, tunnel, etc., comprising an open-topped arm attached to the permanent structure and having a face bent longitudinally of the cable and adapted to engage under said curved portion of the cable intermediate of its ends.

2. Means for supporting the weight of a curved portion of a cable in a manhole, tunnel, etc., comprising an open-topped arm attached to the permanent structure and having a face bent in a convex curve longitudinally of the cable and adapted to engage under said curved portion of the cable intermediate of its ends.

3. Means for supporting the weight of a curved portion of a cable in a manhole, tunnel, etc., comprising open-topped arms attached to the permanent structure, the respective arms having supporting faces which are bent in respectively a convex and a concave curve longitudinally of the cable and adapted to engage under said curved portion of the cable intermediate of its ends.

4. Means for supporting the weight of a curved portion of a cable in a manhole, tunnel, etc., comprising an open-topped arm attached at one end to the permanent structure and bent in a vertical direction at its opposite ends and adapted to engage under said curved portion of the cable intermediate of its ends.

5. The combination with a transverse arm for supporting a straight portion of a cable, of means attached directly thereto for supporting the weight of a curved portion of the cable, and comprising an open-topped device adapted to engage under said curved portion of the cable intermediate of its ends.

6. A cable support comprising, in combination, a transverse arm B having a groove C and a flange D, and a longitudinal arm adapted to rest in said groove and to be attached to said flange.

7. A cable support comprising in combination a T-shaped upright having holes R in its web N spaced according to the vertical separation of the cables, and transverse supporting arms B formed with a deep vertical web W with grooves or sockets C at its upper edge, and with flanges D surrounding said grooves, and flanges Y between said grooves, said transverse arms B having forked inner ends arranged to straddle the web of the upright, having each a shoulder engaging the upright and holding the arm horizontal, and having each a bolt hole permitting its attachment to and detachment from said web without movement of the arm, and by means of a separate bolt S.

8. A cable support comprising in combination a T-shaped upright having holes R in its web N spaced according to the vertical separation of the cables, and transverse supporting arms B having forked inner ends arranged to straddle the web of the upright, having each a shoulder engaging the upright and holding the arm horizontal, and having each a bolt hole permitting its attachment to and detachment from said web without movement of the arm, and a longitudinal arm attachable to any one of said transverse arms and extending at an angle thereto.

9. A cable support comprising in combination a T-shaped upright having holes R in its web N spaced according to the vertical separation of the cables, and transverse supporting arms B formed with a deep vertical web W with grooves or sockets C at its upper edge, and with flanges D surrounding said grooves, and flanges Y between said grooves, said transverse arms B having forked inner ends arranged to straddle the web of the upright, having each a shoulder engaging the upright and holding the arm horizontal, and having each a bolt hole permitting its attachment to and detachment from said web without movement of the arm, and a longitudinal arm having one end shaped to rest in one of said sockets and to be attached to a flange of such socket.

10. A cable support comprising in combination a transverse arm having a socket C surrounded by a flange D, and a longitudinal arm having at one end a flange F arranged to hook over said flange D to hold the longitudinal arm in place.

In witness whereof, I have hereunto signed my name in the presence of two subscribing witnesses.

GEORGE G. RAYMOND.

Witnesses:
 DOMINGO A. USINA,
 FRED WHITE.